Dec. 4, 1923. 1,476,084
M. KIEFER
BELT FASTENER
Filed May 9, 1923
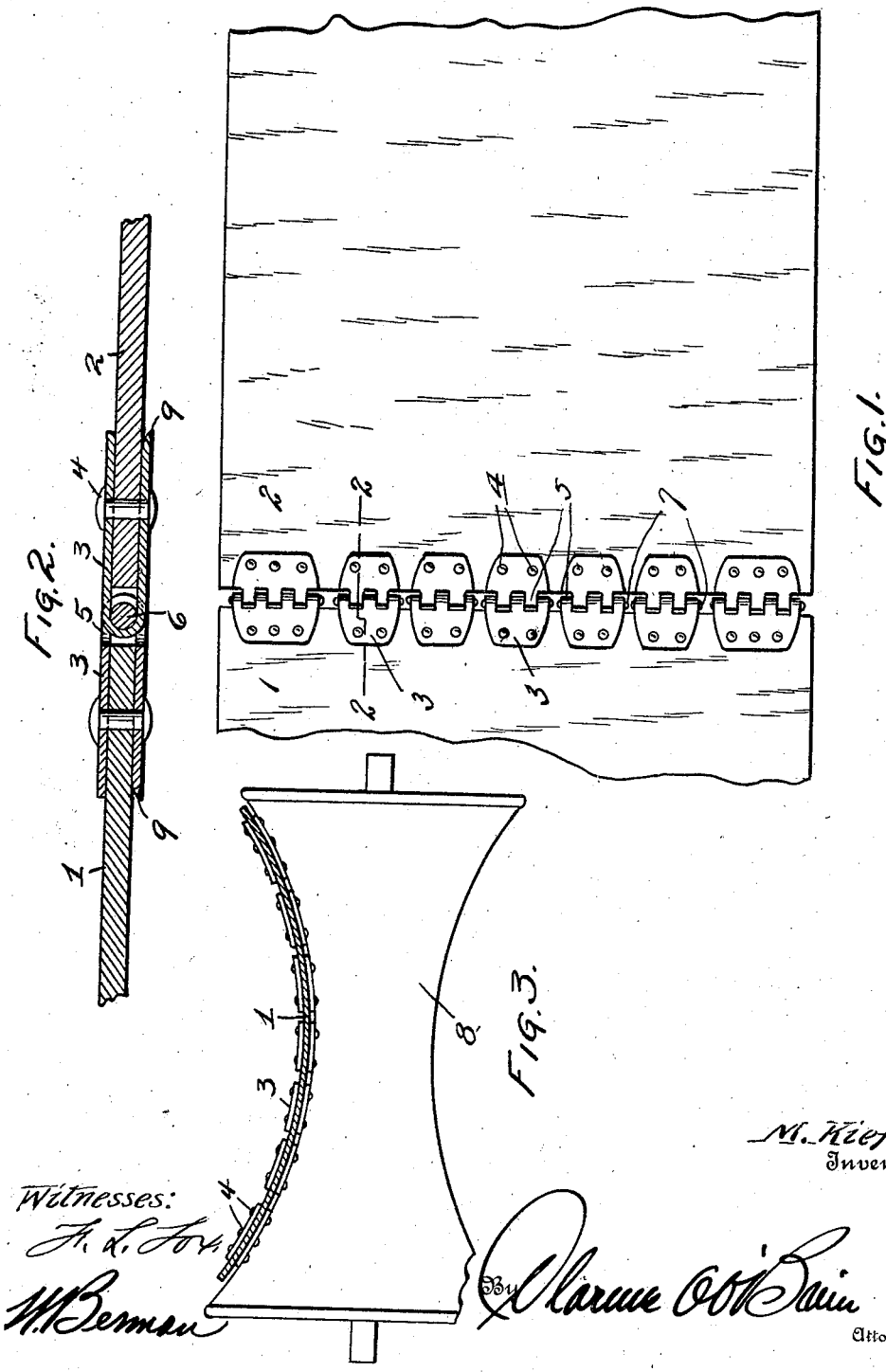

Patented Dec. 4, 1923.

1,476,084

UNITED STATES PATENT OFFICE.

MARTIN KIEFER, OF ELMHURST, ILLINOIS.

BELT FASTENER.

Application filed May 9, 1923. Serial No. 637,704.

*To all whom it may concern:*

Be it known that I, MARTIN KIEFER, a citizen of the United States, residing at Elmhurst, in the county of Du Page and State of Illinois, have invented certain new and useful Improvements in Belt Fasteners, of which the following is a specification.

This invention has reference to belt fasteners and is an improvement upon the belt fasteners shown and described in connection with application, Serial No. 631,518, filed April 12, 1923.

The object of the invention is to provide a belt fastener which is an improvement upon the fastener shown in said application whereby all liability of cutting the edge of the belt as it goes around the pulleys is avoided upon that side which runs nearest to the pulley.

In accordance with the invention, the belt fasteners employed provide a belt lacing in which the joining sections of the belt are connected together by belt bands made up of connected hinges with one hinge narrower than the other so as to allow the belt to go freely with the hinges joined to each other by a conveyor pulley shaft about the hinge connection between the belt hinges, which latter are connected by loosely mounted rollers adding to the life of the belt fastener.

The improved belt fastener lacing is particularly adapted to hold up for any length of time and is usually adapted to pulleys and rollers connected by pivots over which the belt will pass and fold many times without coming apart, thus tending to cause the release of the pin which is liable to come out, necessarily allowing the end of the plate to also catch.

This last contingency has the effect of ruining the whole belt but in accordance with the invention the hinge will give when passing over the rollers without breaking.

If the belt must be shortened all that is to be done is to cut the rivets or flat headed bolts employed, whichever is going to be used, and cut the belt and insert the hinges. However, the hinges and bolts cannot wear rapidly and both hinges and pins or bolts connecting them may be made as strong as needed.

The invention will be best understood from a consideration of the following detailed description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is a plan view of a belt coupling constructed in accordance with the invention;

Figure 2 is a section on the line 2—2 of Figure 1; and

Figure 3 is a section through a belt coupling lengthwise of the coupling of Figure 2.

Referring to the drawings, there are shown two adjacent ends 1 and 2 of a power conveying belt connected by a transverse series of hinges 3, the opposite ends of each being connected to the respective ends of the belt by rivets 4, and with the respective belt connections comprising a pair of sections provided with eyes 5 in interlocking relation, with the eyes traversed by pins or rivets 6 having the ends of the rivets headed as shown at 7 whereby the ends of the belt may be pivotally connected and riveted without danger of the connected ends of the belt pulling apart.

The belt is caused to travel over conical pulleys 8, one of which is shown in Figure 3, with the hinges 3 also shown in the same figure. The rivets or links connecting the hinged sections of the belt together are all metal and afford superior strength, adapting the connected belt to resist breakage when in service and one which will operate under the disadvantage of adverse circumstances.

In the structure disclosed the opposite ends of the hinges beneath the belt of the belt clamp are undercut as indicated at 9 in Figure 2 so as to prevent these ends biting into the belt as the same pass over the pulleys.

What is claimed is:

A device of the class described comprising terminal junction plates connecting the adjacent ends of a belt and including hinge plate with their adjacent ends formed into eyes and said eyes being traversed by a line of links uniting the plates in hinged relation to permit the belt to pass over pulleys without injury to the belt or junction members, said plates being undercut where next to the belt to prevent entrance thereof into the belt.

In testimony whereof I affix my signature.

MARTIN KIEFER.